United States Patent [19]
Bongiovanni

[11] Patent Number: 5,897,895
[45] Date of Patent: *Apr. 27, 1999

[54] METHOD FOR MAKING EXTRUDED MOUNTED FOOD PRODUCT

[75] Inventor: Nicholas J. Bongiovanni, Minneapolis, Minn.

[73] Assignee: Lettieri's Inc., Burnsville, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,949

[22] Filed: Apr. 10, 1997

Related U.S. Application Data

[63] Continuation of application No. 08/341,474, Nov. 17, 1994, abandoned.

[51] Int. Cl.⁶ ........................................... A21D 13/00
[52] U.S. Cl. ................... 426/91; 426/90; 426/94; 426/134; 426/516
[58] Field of Search .................. 426/91, 95, 92, 426/94, 102, 516, 134, 90, 104, 496

[56] References Cited

U.S. PATENT DOCUMENTS

| | | | |
|---|---|---|---|
| 2,589,823 | 3/1952 | Krens | 426/91 |
| 4,144,356 | 3/1979 | McDaniel | 426/91 |
| 4,399,156 | 8/1983 | Bernal | 426/91 |
| 4,689,236 | 8/1987 | Pinto | 426/502 |
| 4,882,185 | 11/1989 | Simelunas et al. | 426/283 |
| 4,888,192 | 12/1989 | Ramnarine | 426/448 |
| 4,938,975 | 7/1990 | Waller | 426/91 |
| 4,966,781 | 10/1990 | Artzer | 426/91 |
| 5,124,161 | 6/1992 | van Lengerich et al. | 426/94 |

Primary Examiner—Lien Tran

[57] ABSTRACT

A highly uniform food product securely mounted on a handle is provided by: (a) coextruding a doughy material and a filling material in the form of an edible elongated extrudate having an outer, doughy layer of unbaked dough and an inner filling surrounded by the outer layer, (b) temporarily supporting the coextrudate on a surface (preferably a conveyor belt) and cutting the elongated extrudate into discrete pieces while the coextrudate is so supported, (c) inserting the handle in each discrete piece, and (d) removing the resulting mounted food product, mounted on the handle, from the temporary support surface, and, optionally but preferably, baking the resulting product and then freezing it. Typical suitable handles for the product include elongated wooden sticks or sticks die-cut from heavy card stock. The stick support facilitates consumption of the product while the consumer is actively engaged in shopping, attending a sporting event, etc.

9 Claims, 2 Drawing Sheets

METHOD FOR MAKING EXTRUDED MOUNTED FOOD PRODUCT

This application is a continuation of application Ser. No. 08/341,474 filed Nov. 17, 1994, now abandoned.

FIELD OF THE INVENTION

This invention relates to edible extrudates which can be mounted or supported on a handle means, so that they can be conveniently eaten as snack foods, appetizers, or the like. An aspect of this invention relates to convenience foods having a previously baked or doughy component, which are typically stored in a frozen state and then heated, e.g. with microwave energy, so that they can be conveniently sold to customers seeking snack items to eat while shopping, watching sporting events, or the like.

DESCRIPTION OF THE PRIOR ART

There is presently a very high demand for convenience food products which can be eaten under circumstances ordinarily not conducive to dining, e.g. during sight-seeing, shopping, watching sporting events, etc. Since many dairy, fruit, meat, vegetable are messy to eat under such circumstances (e.g. because they have a very soft or fluid component), stick- or handle-mounting of such products is a common expedient. Stick-mounted ice cream products are typical of such convenience foods. They can be quick frozen, packaged, and sold in food market freezers as convenience foods, or they can be stored in freezers at vending stands.

It is well known that baked or fried products can comprise an outer shell or envelope of baked or fried dough surrounding, partially or completely, a filling material such as ground meat, vegetables, cheese, or the like. Typical examples include the many variations on a rolled-up tortilla with an inner filling (e.g. an enchilada, "burrito", or the like), strombolis, and pizza-like products. If desired, the doughy envelope can be baked until it is dense, crusty, and relatively rigid or is thin and soft, but still exhibiting a baked quality due to the "rising" effect created by gas formation. These products too are convenient to eat and can be stored at vending stands in a cooled or frozen state and heated to order with a suitable type of oven utilizing hot air or infrared or microwave energy or the like, provided the reheating does not adversely affect the texture of the doughy outer layer.

It is also known to mount dough- or crust-containing products on a handle means such as a flat, elongated wooden stick. For example, according to U.S. Pat. No. 3,804,956 (Bongiovanni), issued Apr. 16, 1974, a sheet-like, unbaked pizza shell having a cheese and/or tomato paste layer on its surface can be wound or rolled around the wooden stick, unbaked shell facing out, and baked in place, so that the wooden stick forms an adhesive-like bond with the cheese and/or tomato paste.

Still another approach involves mounting a food product encased in a doughy or crusty outer layer by impaling the product through its outer layer with a wooden stick or handle means.

Typically, such handle-mounted food products are difficult to manufacture efficiently and with a high degree of uniformity. Accordingly, there is a need in this art for improved, well-controlled, and relatively simple and reliable manufacturing methods, preferably methods which lend themselves to high-volume production.

For additional representative examples of prior art disclosures of handle-supported food products and methods for making them, see U.S. Pat. Nos. 4,938,975 (Waller), issued Jul. 3, 1990, and 4,966,781 (Artzer), issued Oct. 30, 1990.

SUMMARY OF THE INVENTION

Briefly, this invention involves (a) coextruding a doughy material and a filling material in the form of an edible elongated extrudate having a longitudinal axis parallel to the direction of elongation and having an outer, doughy layer and an inner filling surrounded by the outer layer, (b) cutting the elongated extrudate into discrete pieces each having a portion of said longitudinal axis, while a portion of said outer layer of said elongated extrudate is temporarily supported on a temporary support surface, so that corresponding portions of the outer layers of the resulting pieces are also temporarily supported on the temporary support surface and unsupported portions of the outer layers of the resulting pieces are exposed, (c) aligning an elongated handle means generally parallel to the portion of said longitudinal axis and inserting the handle means in said piece, and (d) removing the resulting mounted food product, mounted on said handle means, from said temporary support surface. The resulting mounted food product is then preferably baked (before or after removal from the temporary support surface) until the gas-producing agent in the dough is activated. It is particularly preferred that the resulting mounted food product be frozen after such baking so that it can be stored for weeks or even months without deterioration and shipped to convenience stores, street vendors, and the like for sale to customers looking for a product to eat while walking or watching a sporting event or the like.

DETAILED DESCRIPTION

Figure 1:
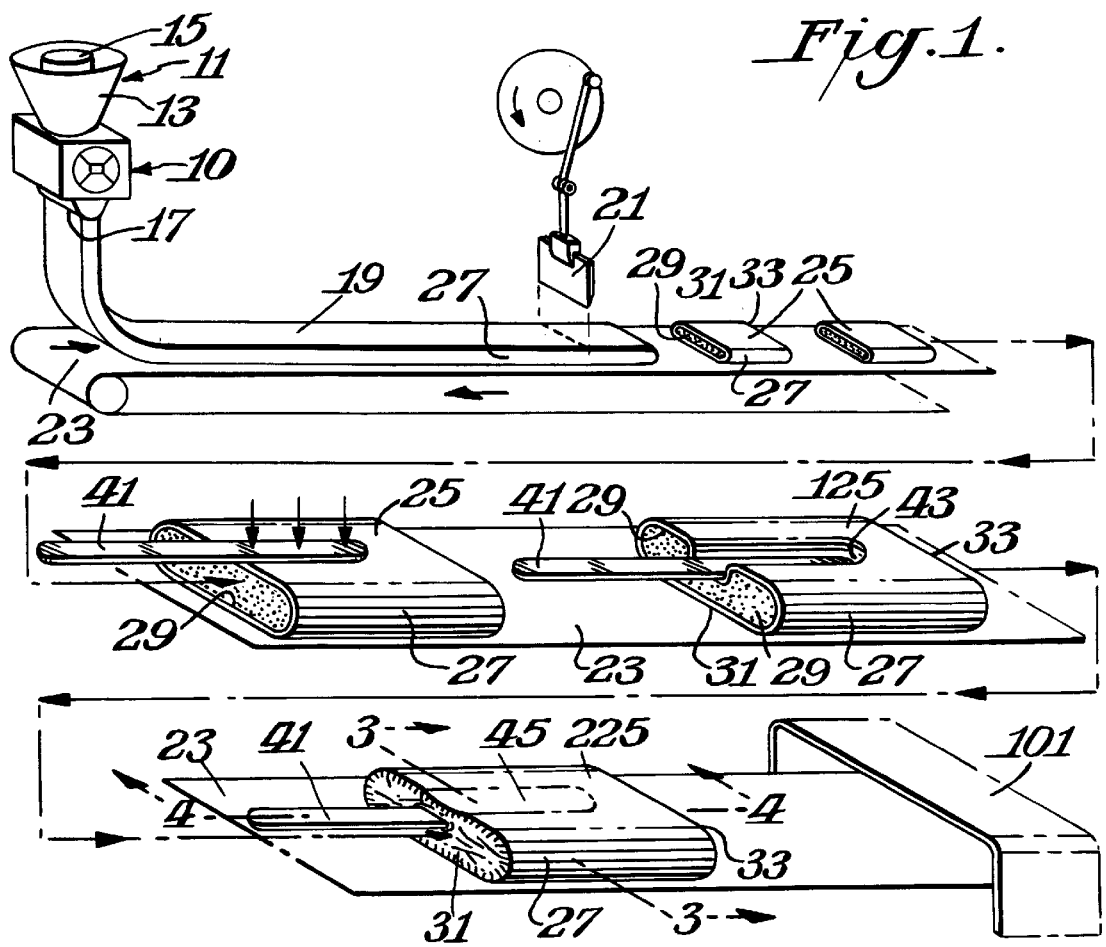
FIG. 1 is a schematic diagram similar to a flow diagram illustrating preferred steps of a process of this invention.

According to the present invention, the handle-mounted product is made from an edible coextrudate, preferably somewhat rectangular in its cross-section, which has been cut or severed into pieces which have the aforementioned generally rectangular shape and are preferably at least slightly elongated (like the shape of many stick-mounted ice cream products). Coextrusion is a technique commonly used in industry and is typically applied to plastic compositions having a plurality of laminae, but this technique has also been successfully applied to food products, and machines for making edible coextrudates are commercially available, e.g the Cornucopia Co-extruder, available from the Rheon company. Suitable modifications of such commercially available to accommodate the process of this invention are within the skill of the art. The coextrusion technique is particularly well suited to the present invention, since the extrusion head or die can efficiently provide a cylindrical or rectangular coextrudate having an outer wall of doughy material and an inner core of filling material. As is known in the art, the extrusion head or die is really a plurality of dies in one: an outer or peripheral die opening extrudes the doughy wall concurrently with the concentric inner core, the concentric inner core being extruded through the concentric inner die opening. Virtually the only requirements for practicing this coextrusion technique in the context of the present invention are that the doughy material and the inner, filler material be sufficiently deformable and plastic at room temperature or moderately elevated temperatures (e.g. 30 to 95° C.) to be forced smoothly through an extrusion die without losing coherence and without being degraded, shredded or broken up, or otherwise rendered unsuitable for continuous manufacture of coherent food products. For example, the filler or doughy material can be selected so as to behave like a highly viscous liquid at moderately elevated temperatures and a soft solid at room temperature. (It is generally preferred that the doughy outer layer have some degree of solidity at room temperature.)

An unbaked pizza dough comprising flour and moisture and a gas-producing agent (e.g. yeast or a non-toxic organic or inorganic gas-producing agent such as a bicarbonate, or a gas-releasing agent, the gas generally being $CO_2$ or, less preferably, $N_2$ or $O_2$) is particularly well suited for use as the doughy material which forms the outer wall or layer of the coextrudate. Doughy materials containing corn meal (e.g. taco or tortilla mixes) or potato meal (e.g. a Scandinavian-style lefse dough) are also suitable. When a tortilla-like product or a so-called "Mexican pizza" is desired, the dough can contain seasonings to enhance the tortilla-like or taco-like flavor.

It is particularly preferred that the formulation and handling of the doughy material be sufficiently well-controlled to avoid activation or de-activation of the yeast or other gas-producing agent. (Ideally, the yeast or other gas-producing agent should remain completely dormant but fully activatable until the product is baked.) Since frictional forces or viscous flow resistance forces produced during coextruding (and particularly prior to coextrusion, e.g. during mixing) can heat up the dough formulation to temperatures of about 30° C. (about 85° F.) and higher and can activate some yeasts, especially good quality control can be obtained either by keeping temperatures below 30° C. or by utilizing a so-called sour dough mixture containing sodium bicarbonate as a gas-releasing agent. When baked, the dough can be tough or dense and crusty, or it can be soft like baked bread, depending on the nature of the desired food product.

The inner or filler material can comprise meat, vegetable, fruit, dairy products (e.g. cheese), or any combination of these. Flavoring can be added to the filler to impart the taste of a pizza, a tortilla or taco, or whatever the product is intended to be or to resemble. For an art-recognized explication of the term "pizza", reference is made to the disclosure of U.S. Pat. No. 3,615,678 (Tangel et al), issued Oct. 26, 1971. For particularly efficient manufacturing, it is desirable that the filler material be blended thoroughly or even homogenized, but heterogeneous filler materials can be used in this invention, so long as they can be extruded.

The handle means on which the food product is mounted can be conventional, e.g. the conventional flat, wooden stick (similar to a narrow tongue-depressor) used in stick-mounted ice cream products. Alternatively, the flat stick can be die-cut from a high ream-weight waterlaid sheet such as stiff card stock or cardboard. The handle means can also be an elongated stick with a generally round cross-section. For secure attachment to the food product, the elongated stick or handle means can be provided with a series of holes or serrations, preferably concentrated near one end of the stick or handle.

In one preferred embodiment of this invention, the handle means is inserted through a plate-like member which serves as a supporting platform for the bottom end of an elongated food product.

In the process of this invention, the elongated handle means becomes embedded in the edible coextrudate. The exposed ends of the coextrudate can then be pinched off, so that the doughy outer layer or wall envelopes the filler material more or less completely. Although the handle means can be oriented parallel to the longitudinal axis of a piece of coextrudate (preferably, in this case, in—or in closely spaced relation to—the plane of the longitudinal axis as well) and inserted through one end of this piece (i.e. directly into the filler material), it is greatly preferred for efficiency of operation that the handle means be simply laid down on the outer, exposed surface of an exposed side of the freshly-cut pieces of coextrudate and depressed mechanically or by hand to a depth which is at or in closely spaced relation to the central depth of the interior of the product, the handle being oriented so as to coincide generally with the axis of the product (the axis which will be the vertical axis when the product is held with the handle means). The dough therefore wraps around the surface of the handle means which is pressed into the outer dough layer, and a seam or elongated depression is formed on the exposed surface of the coextrudate piece. This seam or depression can be filled in with doughy material, so that the original shape of the coextrudate piece (e.g a generally block-like or cylindrical shape) is generally restored, and the handle ultimately becomes completely encircled by baked dough, integral with the outer, baked dough layer, thereby forming a very secure attachment of the handle to the food item which it supports.

Turning now to the Drawing, FIG. 1 illustrates a preferred embodiment of this invention which is particularly well-suited to high volume production of handle-mounted food products. An important feature of the apparatus used to carry out the process is coextruder 10, which comprises a two-fill hopper 11 and a coextrusion nozzle or plural die opening 17. If desired, a heater (not shown) can be enclosed within coextruder 10 to heat the materials fed through hopper 11 to mildly elevated temperatures which improve their rheology, but the materials to be extruded are preferably formulated such that no heat is needed; moreover, internal heat generated by frictional forces or the like is preferably kept under control. Hopper 11 is divided into two sections, a first section 13 for receiving a coherent, plastic, readily deformable unbaked doughy material, and a second section 15 for receiving a filler material. The elongated coextrudate 19 which emerges from the plural die opening 17 of extruder 10 is generally rectangular in cross-section and has an outer layer or wall 27 comprising the doughy material and an inner core 29 comprising the filler material. Coextrudate 19 is temporarily supported on the upper half of conveyor belt 23 which moves coextrudate 19 away from the plural die opening 17 of extruder 10. A reciprocating knife blade 21 automatically cuts, chops or severs the elongated extrudate into pieces 25 which have open ends, a forward end 33 pointing in the direction of movement of the upper half of conveyor belt 23, and a trailing or opposite end 31. However, the filler material of inner core 29 is sufficiently solid at room temperature to remain in place within piece 25 and does not run onto the surface of belt 23. Similarly, the doughy material of outer layer or wall 27 is sufficiently coherent at room temperature to retain the material of core 29 despite the openness of ends 31 and 33. (Even in those embodiments of the invention utilizing a heated coextruder, the coextrudate quickly cools—or is quickly cooled—to approximately room temperature shortly after contacting the upper half of belt 23.)

The next major step in the process is the insertion or embedding of the handle means or stick 41. Stick 41 is placed generally in the center of the upper surface of wall 27 and is forced downward (as shown by the arrows along the length of stick 41) deep into the interior of piece 25. This stick-depressing action causes the upper surface of wall 27 to pucker or form a seam-like, elongated depression 43, which partially encircles the depressed stick 41. The resulting intermediate product 125 can be restored to generally its original shape by filling in the depression 43 with more doughy material 45. A further purpose of applying doughy material 45 is to seal in the stick 41 so that it cannot move from its position, which position is generally coincident with the longitudinal axis of intermediate product 125 or in closely-spaced relation to this longitudinal axis. Ends 31 and 33 of intermediate product 125 can then be pinched shut, either by machine or by hand, and the result is a product 225 with a completely sealed-in stick 41 protruding from the end 31, and, as pointed out previously, the attachment of the stick is especially secure. If desired, one or more coatings (not shown) of food material (e.g., in the case of pizza-like products, cheese and/or tomato paste) can be applied to the outer surfaces of the doughy outer layer or wall 27 of product 225.

In a preferred embodiment of this invention, baking is carried out in-line by passing the product 225 while on the upper surface of belt 23 through a tunnel oven 101. Alternatively, however, the product 225 can be removed from belt 23 then placed on large trays or the like (not shown) suitable for insertion in large commercial baking ovens. In-line freezing of the baked product is certainly permissible but is optional, since the product can be formulated to keep for many hours at room temperature before being frozen. The baking and freezing steps are conventional and need not be described in detail. For a disclosure of a pizza freezing process, see the Tangel et al patent (U.S. Pat. No. 3,615,678) cited previously.

Removal of product 225 from belt 23 is normally accomplished simply by lifting the product off or permitting it to slide off the end of the conveyor system, since the doughy component of the product is ordinarily formulated so as not to stick to most types of conveyor belts. If sticking of the product to the belt does become a problem, a release layer can be applied to the surface of the belt (e.g. by dusting the surface of the belt with flour or by applying a non-toxic mold-release agent to the belt).

Figure 3:
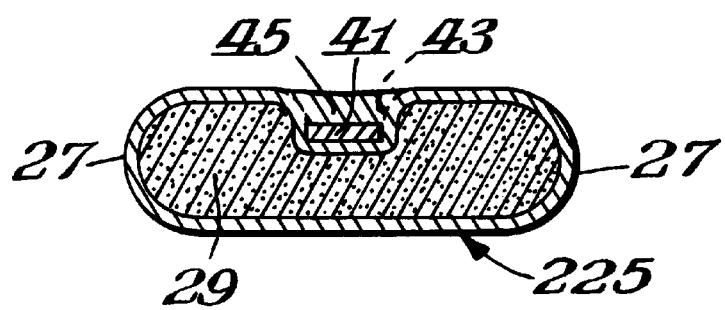
FIG. 3 is a cross-sectional view of a product produced by the process of this invention, taken along line 3—3 of FIG. 1.
Figure 4:
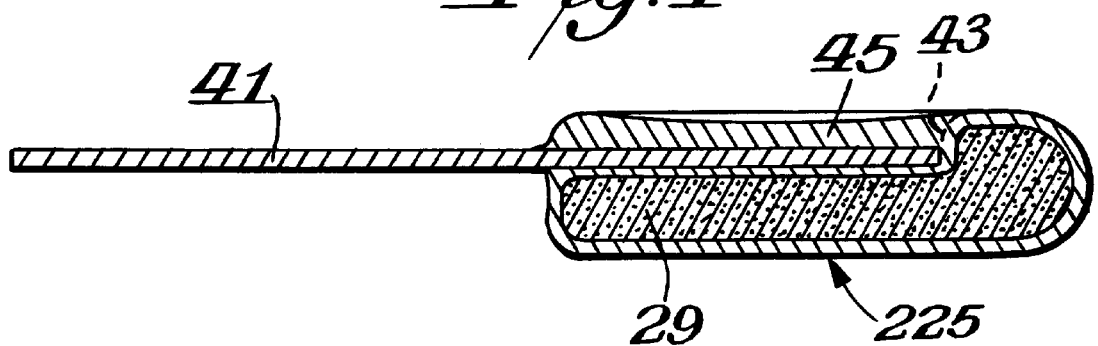
FIG. 4 is a cross-sectional view of a product produced by the product of this invention, taken along line 4—4 of FIG. 1.

The internal structure of product 225 can be seen clearly in FIGS. 3 and 4, wherein like numbers denote like parts of the product as shown in FIG. 1. As indicated above, additional layers (not shown) can be applied to wall 27. These additional coatings on the outside of product 225 can be applied most conveniently before or after baking and can be brushed on, sprayed on, roller-coated, or the like.

Figures 2A, 2B, 2C, 2D, 2E:
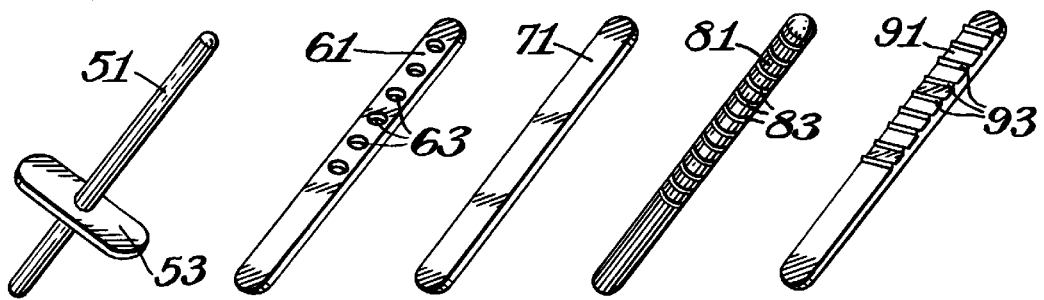
FIGS. 2A to 2E are perspective views of various embodiments of handle means suitable for supporting a handle-mounted food product produced by the process of this invention.

FIGS. 2A to 2E illustrate a variety of handle designs suitable for insertion into the product in accordance with the principles of this invention. As shown in FIG. 2A, elongated stick 51 is inserted through a sheet-like or plate-like platform means 53 which provides additional support for the end of the food product which becomes the lower end when the product is held upright. Elongated flat sticks 61 and 71 (FIGS. 2B AND 2C, respectively) have the conventional tongue-depressor type of configuration, except that stick 61 (FIG. 2B) is provided with a series of holes 63 at one end. The filler material flows through these holes and helps to retain stick 61 in place. Cylindrical stick 81 (FIG. 2D) and flat stick 91 (FIG. 2E) are provided with serrations 83 (FIG. 2D) and 93 (FIG. 2E), respectively, which serve essentially the same purpose as holes 63 of stick 61 (FIG. 2B) by providing a more secure grip on the filler material.

Thus, the present invention provides a securely-mounted food product which lends itself to a variety of styles and flavors, including pizza-like and stromboli-like products, tortilla-wrapped products, and other filled products having a doughy outer shell and, if desired, further layers coated onto the outside of the doughy shell. Any given food product manufactured according to this process can be generally uniform in size, shape, texture, consistency, and taste and hence can be a high-volume product.

What is claimed is:

1. A method for preparing a mounted food product, comprising the following steps:

a. feeding to a coextrusion die an unbaked but coherent, doughy material containing a gas-producing agent and a filling material selected from a group consisting of meat, vegetable, dairy, fruit filling material, and mixture thereof, said coextrusion die having generally concentric die openings, an outer die opening surrounding a generally concentric inner die opening, the doughy material being fed to the outer die opening and the filling material being fed to the generally concentric inner die opening, b. coextruding said doughy material and filling material to form an elongated extrudate a comprising of an outer layer of said doughy material and inner core of the filling material onto moving, substantially flat, substantially horizontal surface while maintaining the doughy material at a temperature which will not activate or de-activate the gas-producing agent, the direction of movement of said substantially horizontal surface being away from the coextrusion die, so that a lower surface of said elongated extrudate is temporarily supported on said substantially horizontal surface, and an upper, surface of said elongated extrudate is exposed and comprises said doughy material, and the elongated extrudate is conveyed away from the extrusion die, and cutting the elongated extrudate into pieces each having an axis coincident with the longitudinal axis of the elongated extrudate from which they were cut and each having a freshly-cut first end, pointed toward the direction of movement of the substantially horizontal surface, and a freshly-out opposite end, pointed in the opposite direction, c. embedding a handle in the doughy material of the upper, exposed surface of each of said piece by providing an elongated depression into an interior of said doughy material of the upper exposed surface, said elongated depression being substantially coincident with the axis of each said piece, and locating said handle in said depression;

d. sealing the handle in place by filling the depression with additional doughy material such that the handle is completely encircle with the doughy material, and e. activating said gas-producing agent by partial baking of said pieces thereby forming said mounted food product.

2. The method according to claim 1, wherein the resulting mounted food product is baked and then frozen.

3. The method according to claim 2, wherein the resulting mounted food product, after being baked, is frozen sufficiently to be stored without deterioration.

4. The method according to claim 2, wherein said resulting mounted food product is removed from said support surface prior to being baked.

5. The method according to claim 1, wherein said handle is made of waterlaid card stock.

6. The method according to claim 1, wherein said elongated extrudate and said pieces have a generally rectangular cross-section.

7. The method according to claim 1, wherein said resulting mounted food product is at least partially baked in place on said support surface and is removed from said surface after said at least partial baking.

8. The method according to claim 1, wherein said handle has been inserted through a sheet-like platform having an area approximately equal to the area of said opposite end.

9. The method according to claim 1, wherein said handle has a generally round cross-section.

* * * * *